United States Patent [19]

Sully et al.

[11] Patent Number: 5,042,746
[45] Date of Patent: Aug. 27, 1991

[54] NOZZLE ASSEMBLY FOR AIRCRAFT

[75] Inventors: George Sully; Graham N. Freeman; Kenneth Ainscow, all of Preston, United Kingdom

[73] Assignee: British Aerospace Public Limited Company, London, England

[21] Appl. No.: 357,141

[22] Filed: May 26, 1989

[30] Foreign Application Priority Data

Jun. 1, 1988 [GB] United Kingdom ................. 8812978

[51] Int. Cl.$^5$ ............................................. B64C 15/00
[52] U.S. Cl. ................................ 244/12.5; 244/23 D; 239/265.27
[58] Field of Search ..................... 244/12.3, 12.4, 12.5, 244/23 A, 23 B, 23 D; 60/230, 232; 239/265.19, 265.27, 265.29

[56] References Cited

U.S. PATENT DOCUMENTS

| 2,885,159 | 5/1959 | Ashwood | 244/12.5 |
| 3,271,948 | 9/1966 | Fuller | 244/12.5 |
| 3,416,754 | 12/1968 | Pinaire et al. | 60/232 |
| 3,779,282 | 12/1973 | Klees | 137/625.46 |
| 4,478,377 | 10/1984 | Fletcher et al. | 244/12.5 |
| 4,506,848 | 3/1985 | Fletcher et al. | 244/12.4 |

FOREIGN PATENT DOCUMENTS

| 2833678 | 2/1979 | Fed. Rep. of Germany | 244/12.5 |
| 1132157 | 10/1968 | United Kingdom . | |
| 2188885 | 10/1968 | United Kingdom | 244/12.5 |
| 2016391 | 9/1979 | United Kingdom . | |
| 2050260 | 1/1981 | United Kingdom . | |
| 2090209 | 7/1982 | United Kingdom . | |
| 2090210 | 7/1982 | United Kingdom . | |

OTHER PUBLICATIONS

*Harrier II V/STOL Light Attack*, McDonnell Douglas Aircraft Company, pamphlet, 1983.

Primary Examiner—Michael J. Carone
Attorney, Agent, or Firm—Cushman, Darby & Cushman

[57] ABSTRACT

An aircraft includes a nozzle assembly 18, 20 for exhausting efflux from the powerplant. Each nozzle assembly may be moved from a stowed position in which it is flush with the surrounding surface of the aircraft to an operative position in which it projects therefrom to exhaust efflux.

12 Claims, 3 Drawing Sheets

NOZZLE ASSEMBLY FOR AIRCRAFT

This invention relates to a nozzle assembly for an aircraft of the vertical and/or short take-off (V/STOL) type.

In a conventional V/STOL aircraft, the fuselage is provided with a pair of forward nozzles and a pair of rearward nozzles which are capable of vectoring the generated thrust between a rearward direction, for forward thrust, and a downward direction for lift or an intermediate position for a combination of lift and thrust. In one such aircraft the thrust is deflected by means of rotatable louvres. Such arrangements however protrude from the fuselage and therefore cause drag in forward flight and both pairs of nozzles are used for both normal and hover flight modes.

In our U.K. Patent Specifications 2090209 and 2090210 we disclose an aircraft which includes twin nozzles provided one to either side of the fuselage, in the wing root adjacent the trailing edge of the wing. The nozzles are shaped to have a cross-section which matches that of the wing immediately forward of the nozzles so that the drag attributable to the nozzles in normal flight is reduced. The aircraft does not include any other propulsion nozzles. This arrangement is however limited to those applications where it is feasible to locate the rotatable nozzles adjacent the trailing edge of the wing. A disadvantage of this arrangement is that in normal flight the efflux exhausting from the nozzle scrubs along the fuselage leading to inefficiencies. Also, where the efflux is hot, it is necessary to protect the fuselage in some way against the effects of the hot efflux. In addition, whilst this arrangement may reduce the drag attributable to the nozzles, it still creates a disturbance of the shape of the wing which may give rise to increased base drag or to cross flows which themselves cause drag. Other attempts to provide vectored thrust for V/STOL aircraft have included systems with deflecting vanes or flaps which can be introduced into the efflux to deflect it downwardly (see for example U.K. Published Application No. 2016391). Such arrangements however need special side walls for containing the flow and tracks for deploying the flaps.

Another arrangement, described in U.S. Pat. No. 3,416,754, includes movable nozzles mounted in an aft portion of the fuselage spaced beneath the trailing edge of the wing. In a rearwardly directed position the nozzles exhaust through an expansion duct to provide all the thrust required for forward flight. The expansion duct may be folded out of the way to allow the nozzles to be directed downwardly or forwardly to provide lift or reverse thrust respectively. This arrangement is cumbersome and does not allow a smooth operational transition from cruise mode to lift or reverse thrust mode. Furthermore, the arrangement requires that all the propulsion efflux generated by the main power plant is exhaused through the nozzles.

In all of the published arrangements discussed above the vectorable nozzles are always active when the aircraft is in flight and hence are never completely hidden. UK Published Patent Application No. 2188885 discloses an arrangement in which a rotatable nozzle is mounted in the fuselage and may be rotated to deploy from the fuselage and provide lift and/or thrust. The arrangement is cumbersome, taking up valuable fuselage space, requiring a large diameter bearing together with a complex system of fore and aft fairings to accommodate the locus of movement of the nozzle.

According to one aspect of this invention, there is provided an aircraft of the vertical and/or short take-off type, including port and starboard wing portions, port and starboard nozzle assemblies associated with the port and starboard wing portions and spaced forward of the trailing edge of the wing, each nozzle assembly including nozzle means movable between a stowed position in which it lies generally within the envelope defined by the adjacent surfaces of the body portion and the wing portion, and a lift generating position in which it projects downwardly from said envelope for exhausting efflux to generate, in use, at least a component of lift.

According to another aspect of this invention there is provided an aircraft of the vertical and/or short take-off type, comprising a wing portion and a nozzle assembly provided generally within the wing portion forward of the trailing edge thereof, said nozzle assembly comprising nozzle means mounted for rotation about an axis generally coplanar with said wing portion for movement between a stowed position in which at least part of the nozzle means defines a substantially smooth and continuous surface with the surrounding region of said wing portion, and a deployed position in which at least part of said nozzle means projects from the wing portion for exhausting propulsion fluid.

The specific embodiment of the invention disclosed herein provides a configuration in which many of the disadvantages inherent in previous arrangements are overcome. For example, when in the normal cruise configuration, the illustrated embodiment of the nozzle arrangement contributes little or no drag. In the illustrated embodiment the nozzle arrangement is used only during a hover mode or during a transition between a hover mode and forward flight. The principle thrust is generated at a main nozzle at the aft end of the aircraft, thus avoiding the problems inherent in the arrangement of U.S. Pat. No. 3,416,754. The illustrated embodiment does not require any external track arrangements or projecting flaps during normal flight in contrast to the arrangement of U.K. Published Specification No. 2016391. Unlike the arrangements of U.K. Patent Specifications Nos. 2090209 and 2090210, the illustrated embodiment of the nozzle arrangement does not disturb the external aerofoil sectional shape of the wing in normal flight and thus base drag may be reduced and there is no discontinuity in the spanwise section of the wing. Compared to UK Published Specification No. 2188885 the illustrated arrangement is considerably less cumbersome and complex making more economical use of space on board the aircraft.

References in this specification to forward, rearward, etc apply to the aircraft when in straight and level flight.

The invention will now be described by way of non-limiting example, reference being made to the accompanying drawings in which.

Figure 1:
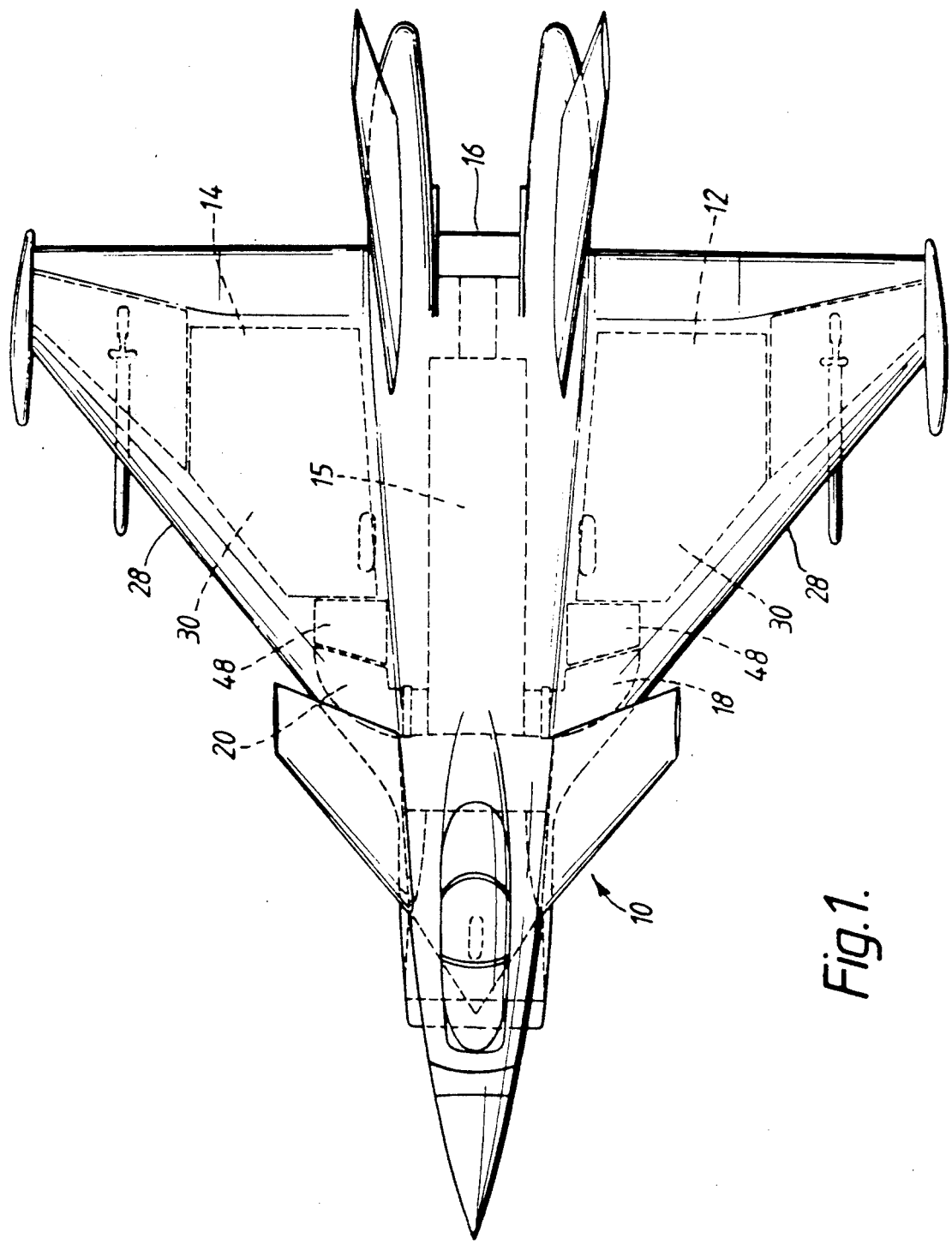
FIG. 1 is a schematic plan view of an example of aircraft according to this invention.
Figure 2:
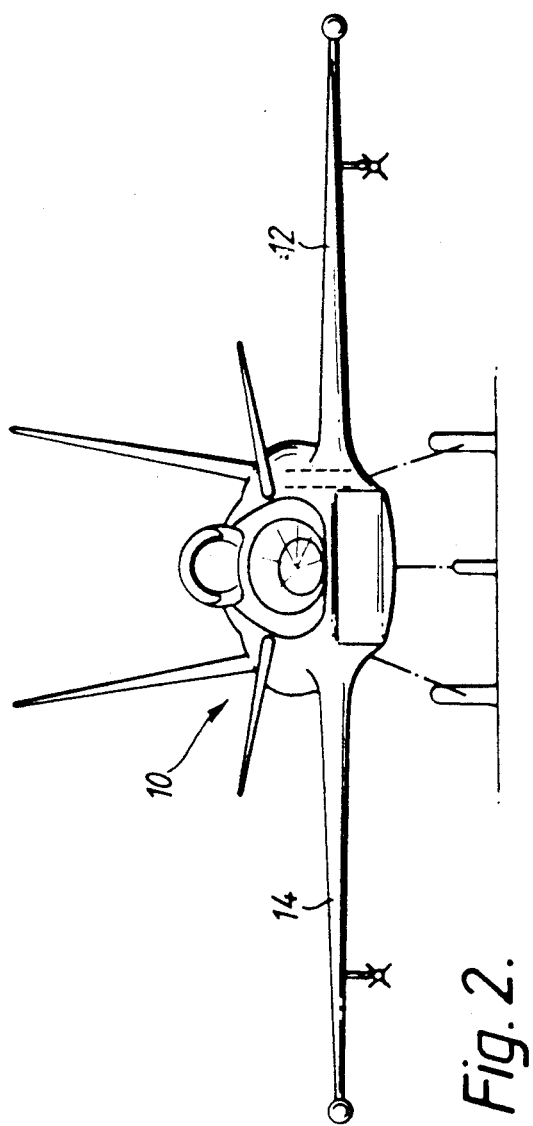
FIG. 2 is a front view on the aircraft of FIG. 1.
Figure 3:
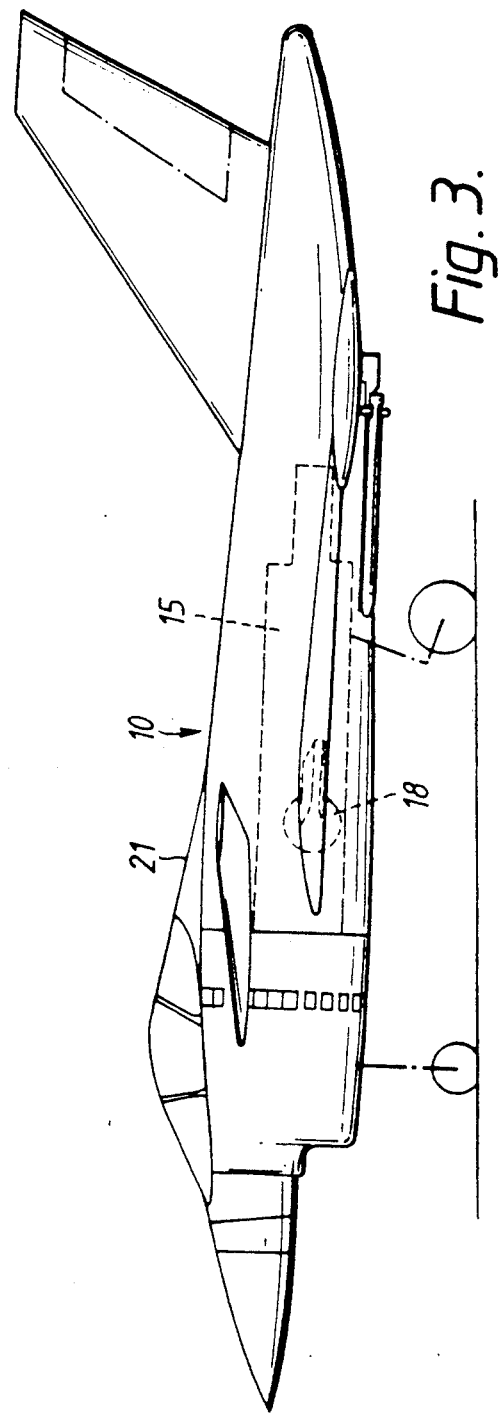
FIG. 3 is a side view on the aircraft of FIGS. 1 and 2.

Referring to the Figures, there is illustrated a V/STOL aircraft including a main fuselage 10, port and starboard wings 12 and 14 respectively, a powerplant 15 housed within the fuselage 10, a main aft nozzle 16 at the aft end of the fuselage and twin port and starboard nozzle assemblies 18 and 20 respectively.

The powerplant 15 may be a high by-pass ratio power-plant capable of two modes of operation. In a normal flight mode, the powerplant delivers both cool by-pass air and hot core efflux to the main aft nozzle 16. In a hover mode, the powerplant delivers cool by-pass air to the twin port and starboard nozzle assemblies 18 and 20 and hot core efflux to the main aft nozzle 16. Details of suitable powerplants capable of meeting these criteria are well known to those skilled in the art. For example a powerplant capable of operating in series or parallel modes may be used with a suitably modified annulus inverting valve of the type disclosed in U.S. Pat. No. 3,779,282.

Figure 4:
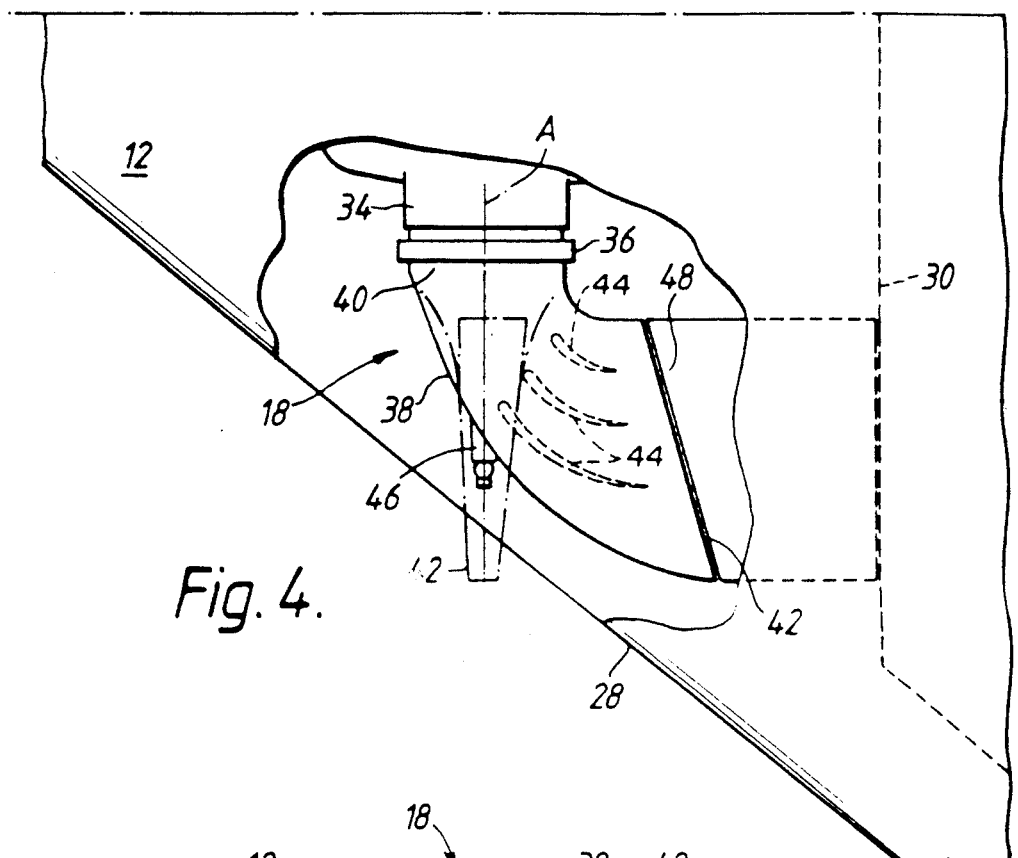
FIG. 4 is a detail plan view, part cut away, of the port wing of the aircraft of FIG. 1, illustrating the nozzle arrangement.
Figure 5:
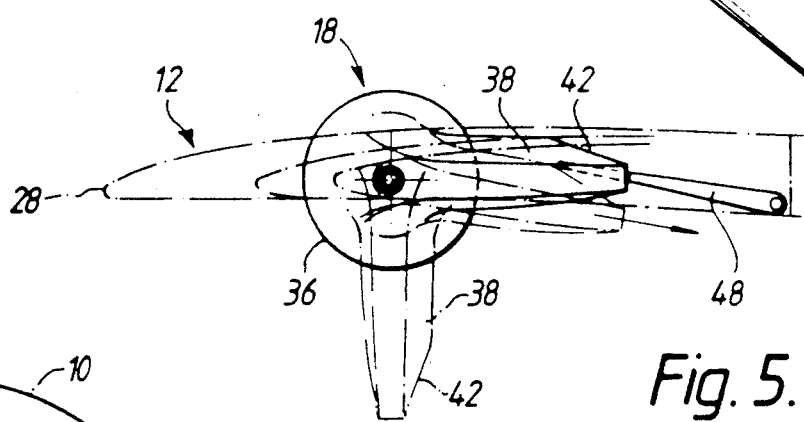
FIG. 5 is a longitudinal sectional view on the part of the aircraft illustrated in FIG. 3.
Figure 6:
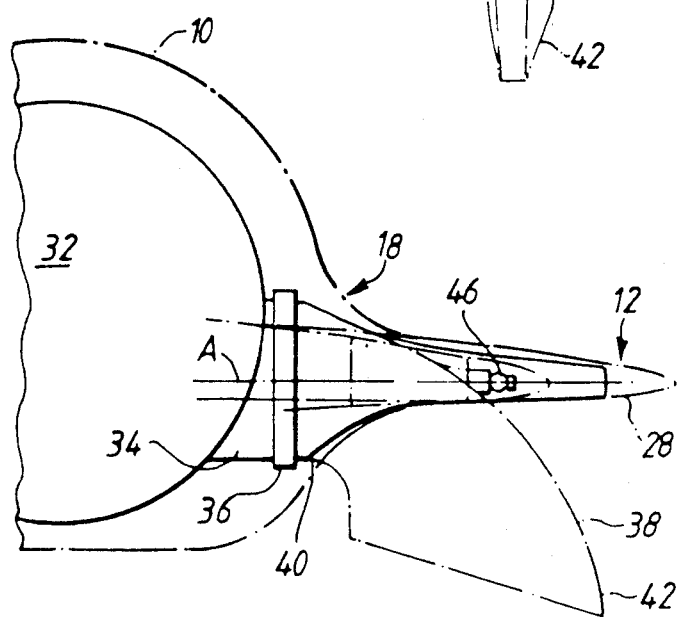
FIG. 6 is a transverse sectional view on the part of the aircraft illustrated in FIGS. 4 and 5.

Each nozzle assembly 18, 20 is located within the associated wing, 12, 14 adjacent the merger of the wing with the main fuselage 10. Each assembly lies adjacent the leading edge 28 of the associated wing and forward of the wing torsion box 30 which is located in a main transverse portion of the wing. A plenum chamber 32 for receiving cool air in the hover mode includes two branches 34 each for delivering the air to one of the nozzle assemblies. Each branch terminates in an inboard bearing assembly 36 which rotatably supports a nozzle 38 for movement about a transverse, generally horizontal axis 'A'. The nozzle 38 is of generally circular cross section at its inlet end 40 and changes section smoothly to terminate at an outlet end 42 of generally trapezoidal cross section matching that of the associated section of the wing (see particularly FIG. 4). The nozzle is cranked through roughly 90° and includes internal vanes 44 to assist the change in direction of the flow. The nozzle is also supported at a portion intermediate its ends by an outboard bearing 46 which is secured to a structural rib (not shown) in the wing. The lower surface of the nozzle 38 is generally continuous with the surrounding parts of the fuselage when the nozzle is stowed in the wing. Immediately aft of the rib 38 is provided a wing lower flap 48 which is pivotally mounted adjacent its aft edge for movement between a position in which, together with the lower surfaces of the nozzle 38 and the wing 12, 14, it defines a smooth and continuous surface and a retracted or withdrawn position (seen in FIG. 5) in which it is pivoted upwardly into the interior of the wing. Seals (not shown) may be provided between the nozzle and the surrounding exposed surfaces of the aircraft.

Each nozzle assembly includes a drive (not shown) to rotate the nozzle to its required positions in accordance with control commands, and a drive to pivot the wing lower flaps 48 upwardly into the wing when required. A common drive may be provided for each nozzle assembly which both rotates the nozzle assembly and retracts the wing lower flaps.

In normal wingborne flight, the nozzles 38 are stowed completely within the envelope of the associated wing and the lower surfaces of the nozzle and the wing flap define a generally smooth and continuous lower surface for the wing. Thus in their stowed positions, the nozzles do not disturb either the longitudinal or transverse shape of the wing, and thus do not contribute significantly to the drag attributable to the wing. In this phase, the by-pass air and hot core efflux from the powerplant are mixed and exhausted through the main nozzle 16.

In a transitional phase, e.g. for short take off or where it is wished to change from normal wingborne flight to a hover, the nozzles 38 are deflected downwardly, initially to about 10° deflection from horizontal, and the wing lower flaps 48 are withdrawn upwardly into the wing to prevent them protruding into the flow from the nozzles 38. In this configuration at least some of the by-pass air from the powerplant is exhausted through the nozzles 38, the remainder of the efflux passing to the main nozzle 16. The nozzles 38 can be pivoted up to 90° deflection. The thrust lines when the nozzles 38 are at 90° deflection each incorporate a toe-out of 5°.

Whilst the above arrangement is described with reference to an aircraft of a single fuselage delta wing configuration, it will be appreciated that it can be used with other configurations of aircraft, for example those which incorporate twin boom arrangements.

Also, although the above arrangement is illustrated as being folded into or out of a wing structure, it may also be folded into or out of another part of the aircraft, for example the fuselage or a boom etc.

We claim:

1. An aircraft of the vertical and/or short take-off type, including a body portion, port and starboard wing portions, port and starboard nozzle assemblies associated with the port and starboard wing portions and spaced forward of the trailing edge of the associated wing portion, each nozzle assembly including nozzle means rotatable about a respective rotational axis contained generally within the associated wing portion, each nozzle means being rotatable between a stowed position in which it lies generally within the envelope defined by the adjacent surfaces of the body portion and the wing portion, and a lift generating position in which it projects downwardly from said envelope for exhausting efflux to generate, in use, at least a component of lift.

2. An aircraft according to claim 1, wherein each nozzle means includes an inlet end of generally circular section and an outlet end of generally quadrilateral section and said nozzle means is cranked intermediate said inlet and outlet ends and the cranked portion is provided with internal vane means.

3. An aircraft according to claim 2, wherein the inlet end of each nozzle is rotatably carried by bearing means provided within the body portion of said aircraft and the cranked intermediate portion is connected to bearing means provided within the associated wing portion.

4. An aircraft according to claim 1, wherein the lower surface of each wing portion includes a flap element aft of the nozzle means, said flap element being pivotable from a position in which it forms a generally smooth and continuous surface with the adjacent surface of said wing, to a withdrawn position in which the outlet end of the nozzle means is at least partially uncovered.

5. An aircraft according to claim 1, wherein each of said nozzle means is movable to exhaust its efflux at any deflection within the range from about 10° to about 90° to the horizontal.

6. An aircraft according to claim 1, wherein each nozzle assembly is located intermediate the leading edge of the wing portion and a main transverse portion thereof.

7. An aircraft according to claim 1, wherein said nozzle assemblies are provided with propulsion fluid generated by a propulsion powerplant mounted within a body portion of the aircraft.

8. An aircraft according to claim 7 wherein said aircraft includes a thrust nozzle arrangement for generating forward thrust for conventional flight, and said powerplant is operable to provide cool air to the nozzle arrangements in the wings and relatively hot air to the thrust nozzle arrangement.

9. An aircraft of the vertical and/or short take-off type, comprising a wing portion and a nozzle assembly provided generally within the wing portion forward of the trailing edge thereof, said nozzle assembly comprising nozzle means mounted for rotation about an axis generally coplanar with said wing portion for movement between a stowed position in which at least part of the nozzle means defines a substantially smooth and continuous surface with the surrounding region of said wing portion, and a deployed position in which at least part of said nozzle means projects from the wing portion for exhausting propulsion fluid.

10. An aircraft of the vertical and/or short take-off type, including a body portion, port and starboard wing portions, port and starboard nozzle assemblies associated with the port and starboard wing portions and spaced forward of the trailing edge of the associated wing portion, each nozzle assembly including nozzle means movable between a stowed position in which it lies generally within the envelope defined by the adjacent surfaces of the body portion and the wing portion, and a lift generating position in which it projects downwardly from said envelope for exhausting efflux to generate, in use, at least a component of lift, and each nozzle means including an inlet end and an outlet end and being cranked intermediate said two ends, the inlet end of each nozzle being rotatably carried by first bearing means provided within a body portion of said aircraft and the cranked intermediate portion being connected to second bearing means provided within the associated wing portion.

11. An aircraft of the vertical and/or short take-off type, including a body portion, port and starboard wing portions, port and starboard nozzle assemblies associated with the port and starboard wing portions and spaced forward of the trailing edge of the associated wing portion, each nozzle assembly including nozzle means movable between a stowed position in which it lies generally within the envelope defined by the adjacent surfaces of the body portion and the wing portion, and a lift generating position in which it projects downwardly from said envelope for exhausting efflux to generate, in use, at least a component of lift, wherein each nozzle assembly is located intermediate the leading edge of the wing portion and a main transverse portion thereof.

12. An aircraft of the vertical and/or short take-off type, including a body portion, a powerplant mounted within said body portion for generating a supply of relatively cool air and a supply of relatively hot air, a thrust nozzle arrangement for generating forward thrust for conventional flight, port and starboard nozzle assemblies associated with the port and starboard wing portions and spaced forward of the trailing edge of the associated wing portion, each nozzle assembly including nozzle means movable between a stowed position in which it lies generally within the envelope defined by the adjacent surfaces of the body portion and the wing portion, and a lift generating position in which it projects downwardly from said envelope for exhausting efflux to generate, in use, at least a component of lift, said powerplant being operable to provide cool air to the port and starboard nozzle assemblies and relatively hot air to the thrust nozzle arrangement.

* * * * *